March 21, 1944.  W. K. PRIESTLEY  2,344,635
ELECTRICAL CABLE
Filed March 21, 1941
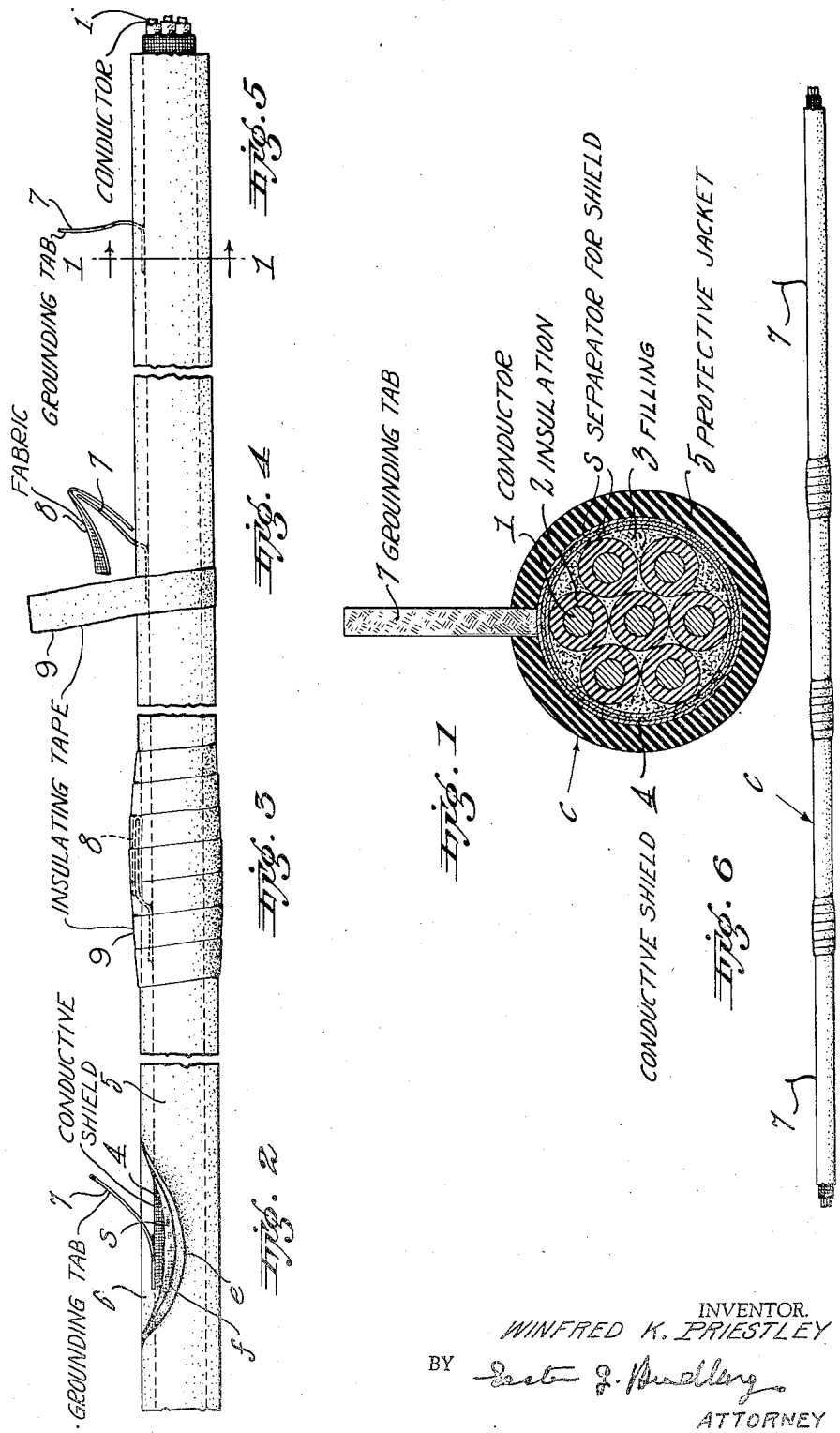
INVENTOR.
WINFRED K. PRIESTLEY
BY
ATTORNEY Patented Mar. 21, 1944

2,344,635

UNITED STATES PATENT OFFICE 2,344,635

ELECTRICAL CABLE

Winfred K. Priestley, West Barrington, R. I., assignor to United States Rubber Company, New York, N. Y., a corporation of New Jersey Application March 21, 1941, Serial No. 384,506

1 Claim. (Cl. 174—107)

This invention relates to a cable having a protective jacket over an electrical shield surrounding one or more conductors and to a method of applying grounding tabs to such a cable at short intervals intermediate its ends.

In cables for connection to radio or other electrical devices, it is desirable to employ an electrical shield surrounding the insulated conductor or conductors contained therein to catch and conduct to ground induced electrical impulses and stray currents so they will not affect or interfere with the performance of radio or other equipment. It is also desirable to have a protective jacket or sheath of rubber or other similar material encasing the shield to provide an abrasion-resisting, moisture proof, and insulating cover over the electrical shield and the conductor or conductors which it surrounds. If placed on the outside the shield is subject to mechanical damage and more effective shielding is obtained by having the shield within the body of the cable.

It has been found that for certain installations of electrical devices, such for example as radio appliances in aircraft, greatly improved performance is obtained by grounding the shield at short intervals along its length. But such grounding can only be effected at the terminals of a cable having a protective jacket over the electrical shield unless the jacket is cut away to give access to the shield, and if this is done another problem arises, namely the problem of sealing the jacket and rendering it water tight around the grounding connections.

By my invention I overcome this difficulty and provide a cable having an electrical shield sealed in a water tight protective jacket, with grounding tabs, at spaced intervals intermediate the terminals of the cable projecting outwardly from the shield through the protective jacket, which do not interfere with the normal handling or use of such cable and any or all of which are readily available for use.

In carrying out my invention I provide a cable with a thermo-plastic protective jacket over an electrical shield, preferably separated therefrom by a wrapping such as braid or cotton. I slit the jacket at intervals prior to vulcanizing, spread apart the edges of the cut sections of the jacket, insert a grounding tab in each slit, and fasten one end of the tab to the electrical shield as by soldering. I then heat the thermo-plastic composition of the jacket, thus causing the rubber jacket to soften and flow around the fixed end of the grounding tab. This step might be performed separately but is most readily accomplished as part of the vulcanizing step which may be performed in a standard way as in a lead pipe mould. When the jacket is indurated a permanent and effective seal is provided, around the longitudinally spaced grounding tabs and over their connections to the electrical shield.

The invention will best be understood if the following description is read in connection with the accompanying drawing in which:

Fig. 1 is a vertical section showing a tab secured at one end to the shield of a cable and projecting through the protective jacket which is sealed therearound.

Fig. 2 is a side elevational view of a length of cable showing a slit in the jacket, and in a separator wrap, with the edges of the slit portions spread apart, and with a grounding tab being secured to the shield where it is exposed by the slit.

Fig. 3 is a side elevational view showing a piece of holland cloth interposed between the free exposed portion of the grounding tab and the surface of the rubber jacket, and with a winding of insulating tape confining the exposed portion of the tab along the surface of the cable.

Fig. 4 is a view similar to Fig. 3 showing the winding of insulating tape being unwound and the piece of holland cloth being removed from the free portion of the grounding tab.

Fig. 5 is a view similar to Fig. 4 showing the tab uncovered and bent in a position for use.

Fig. 6 is a side view of a length of cable showing some of the grounding tabs confined along the surface of the cable and other of the tabs exposed and bent up into operative position.

The cable, indicated generally as C, comprises the conductors 1, which may for example be solid, standard copper wire, each having an insulation covering 2. Between the individual conductors a filling 3, such for example as cotton, jute or other fibrous material, or rubber, or any other suitable material, may be provided. Surrounding the conductors the tubular conducting shield 4 is provided. Any suitable material such, for example, as copper wire mesh, may be used for this shield which entirely surrounds the conductors 1. The shield 4 is encased by the insulating, moistureproof, and wear resisting jacket 5, which is preferably a 40% to 60% rubber compound, providing a thermo-plastic covering in the unvulcanized state.

I prefer to provide a separator S over the shield 4, between it and the jacket 5. The separator S between the shield 4 and jacket 5 prevents the rubber or other composition of the jacket from adhering to the outer surface of the shield and thus keeps the surface of the shield clean, facilitating the operation of joining a grounding tab to the shield. Furthermore, the separator S prevents the shield 4 from being directly bonded to the jacket 5 with the result that the shield is capable of some movement relative to the jacket when the cable is bent. The shield is thus protected from some of the strains to which it would be subjected if bonded to the jacket.

I also prefer to use a separator S under the shield 4, between it and the conductor assembly, to prevent the shield from cutting into the conductors 1. If a filling of unvulcanized rubber is placed around the conductors, the separator S serves to prevent bonding between the rubber and the shield, which would subject the shield to additional strain when the cable is bent, just as in the case of bonding between the shield 4 and the jacket 5.

I have found that satisfactory results are obtained using as a separator a wrapping of cotton, jute or similar fibrous material.

After the cable is assembled and while the jacket 5 is in unvulcanized condition the slits 6 are made at intervals along the cable extending through the jacket 5 and the separator S, and the edges e of the slit portions of the jacket 5 and the edges f of the separator S are spread apart as illustrated in Fig. 2, exposing the outer surface of the shield 4. One end of a grounding tab 7, which may be of any suitable conducting material, such, for example, as a braided flat copper strip, is then inserted in each slit 6 and attached to the outer surface of shield 4, as by soldering, for example. The edges of the slit portions of the separator S and jacket 5 are then released and drawn together and the edges of the slit portion of the jacket 5 may be cemented together, leaving the free portion of tab 7 protruding from the jacket 5. A piece of suitable material 8, such as holland cloth for example, is then inserted between the free portion of the grounding tab 7, protruding above the jacket 5, and the outer surface of the jacket 5, as illustrated in Fig. 3, to prevent the free portion of the tab from adhering to, or being imbedded in, the surface of the jacket 5 during vulcanizing. The free portion of each tab is then confined along the surface of the jacket 5, by means, such for example, as a winding of insulating tape 9, which may be readily removed when it is desired to employ the tab, and which preserves the neat appearance of the cable and prevents the tab from being injured in handling the cable.

After the tabs 7 have been connected to the shield 4 the cable is subjected to heat causing the composition of jacket 5 to soften and flow and thus filling slits 6. The jacket 5 is then indurated and thus forms a water tight seal over the connections between the tabs 7 and the shield 4 and around the outwardly projecting portions of the tabs 7. The step of heating and flowing the rubber composition of jacket 5 is most readily accomplished simultaneously with the step of vulcanizing the cable, after the tabs 7 have been secured to the shield 4 at the points exposed by slits 6 in the jacket 5 and separator S, and after pieces of material, such as holland cloth, have been inserted between the surface of the cable and the free portions of the tabs, and the tabs have been confined along the outer surface of the jacket 5 by windings of insulating tape.

The vulcanizing step may be accomplished in any well known way, as, for example, by passing the cable through an orifice of sufficient diameter to accommodate the diameter of the cable at the points where the tabs 7 are attached, extruding lead onto the cable, and subjecting the lead encased cable to the amount of heat required to effect vulcanization.

After the vulcanizing step the windings of insulating tape 9 and the pieces of material 8 interposed between the tabs 7 and the surface of the cable may be readily removed from such of the tabs 7 as it is desired to employ, as is illustrated in Fig. 4, and the tabs may be bent out more or less at right angles to the cable as illustrated in Fig. 5.

Obviously it will not be necessary to functionally employ all of the tabs 7, but some of them may be uncovered for use while others remain covered but readily available for use at any time, as illustrated in Fig. 6.

My invention has the great advantage of making possible improved results in the operation of electrical devices, particularly radio appliances in aircraft, by providing a jacketed cable, having ready connections intermediate the ends of the cable for grounding an electrical shield contained within the sealed body of the cable.

Having thus described my invention, what I claim and desire to protect by Letters Patent is:

A cable comprising an insulated conductor, an electrically conductive shield surrounding said conductor but insulated therefrom, a protective waterproof sheath surrounding said shield, grounding tabs electrically connected directly to said shield and extending outwardly through said sheath, said tabs having outer end portions extending along and parallel to said sheath, removable protective coverings extending over the end portions of said tabs and retaining said end portions of said tabs in parallel relation to said protective sheath, and removable coverings adjacent to the outer end portions of said tabs to prevent their surfaces from being coated with the insulating material employed in said sheath so that clean electrically conductive grounding surfaces will be provided upon the removal of said last mentioned coverings.

WINFRED K. PRIESTLEY.